United States Patent [19]

Matsuura

[11] Patent Number: 4,543,585
[45] Date of Patent: Sep. 24, 1985

[54] MECHANISM FOR DRIVING A PEN RECORDER

[75] Inventor: Takanobu Matsuura, Takizawa, Japan

[73] Assignee: Alps Electric Co., Ltd., Japan

[21] Appl. No.: 613,098

[22] Filed: May 23, 1984

[30] Foreign Application Priority Data

May 23, 1983 [JP] Japan ............................. 55-77319[U]

[51] Int. Cl.[4] ...................... G01D 9/28; G01D 15/16
[52] U.S. Cl. .................................. 346/49; 346/139 R
[58] Field of Search .................... 346/49, 136, 139 R, 346/141; 33/1 M

[56] References Cited

U.S. PATENT DOCUMENTS 4,405,931 9/1983 Fujisawa ......................... 346/139 R
4,488,159 12/1984 Fujiwara ......................... 346/139 R Primary Examiner—E. A. Goldberg
Assistant Examiner—M. Reinhart
Attorney, Agent, or Firm—Guy W. Shoup

[57] ABSTRACT

A mechanism for driving a pen recorder includes a carriage movable with respect to a recording sheet, a pen holder rotatably mounted on the carriage and carrying a plurality of pens, the pen holder having a writing position in which one of the pens at a time can be located, the pen holder including a rotatable pen selector mechanism, a hammer swingably mounted on the carriage for pressing one of the pens in the writing position toward the recording sheet, a motor, a cam rotatably by the motor, a lever for actuating the hammer, the lever having a portion held in sliding contact with the cam, so that the hammer can be driven by the cam, an intermittent gear rotatable in unison with the cam, and a driven gear held in mesh with the intermittent gear and having a shaft coupled with the rotatable pen selector mechanism.

3 Claims, 4 Drawing Figures

MECHANISM FOR DRIVING A PEN RECORDER

BACKGROUND OF THE INVENTION

The present invention relates to a pen recorder carrying a plurality of pens of different colors, and more particularly to a mechanism for use in such a pen recorder having a single motor for selecting pens and driving a hammer to push the selected pen.

Pen recorders using multicolor pens have a pen holder rotatably mounted on a carriage and holding a plurality of pens. By rotating the pen holder, a pen of a desired color is moved to a writing position. A hammer is disposed in confronting relation to the pen in the writing position. The selected pen is then pressed by the hammer against a recording sheet, and the carriage is moved relative to the recording sheet to record a character, a mark or the like on the recording sheet depending on the movement of the carriage.

The conventional pen recorder has two solenoids employed respectively for rotating the pen holder to select a pen and for driving the hammer. The two solenoids make the recorder large in size and result in an increased expenditure of electric power.

SUMMARY OF THE INVENTION

With the above prior problems in view, it is an object of the present invention to provide a mechanism for driving pen recorders which has a small-size drive source, reduces consumed electric power, and lowers operation noise.

According to the present invention, a mechanism for driving a pen recorder comprises a carriage movable with respect to a recording sheet, a pen holder rotatably mounted on the carriage and carrying a plurality of pens, the pen holder having a writing position in which one of the pens at a time can be located, the pen holder including a rotatable pen selector mechanism, a hammer swingably mounted on the carriage for pressing one of the pens in the writing position toward the recording sheet, a motor, a cam rotatable by the motor, a lever for actuating the hammer, the lever having a portion held in sliding contact with the cam so that the hammer can be driven by the cam, an intermittent gear rotatable in unison with the cam, and a driven gear held in mesh with the intermittent gear and having a shaft coupled with the rotatable pen selector mechanism.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
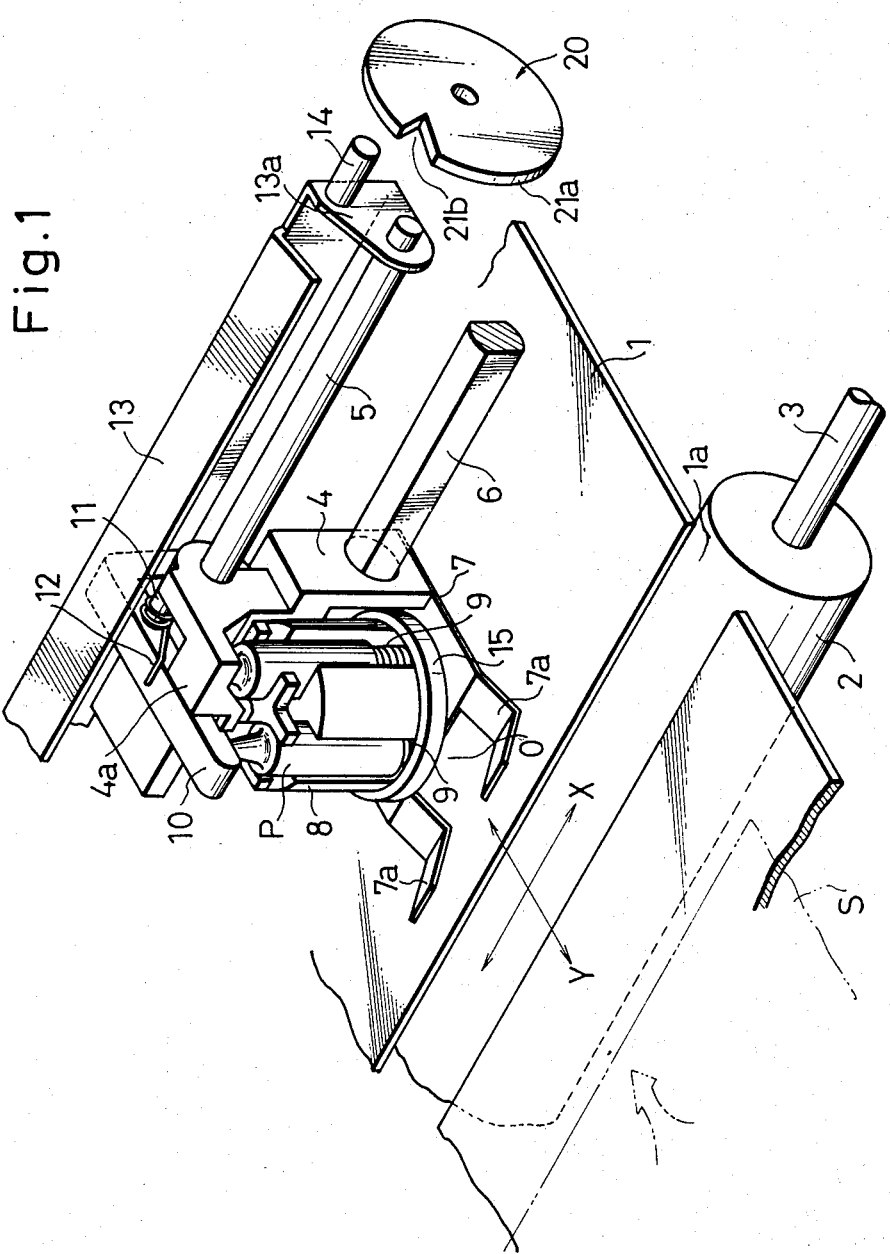
FIG. 1 is a perspective view or a pen recorder.

FIG. 1 shows in perspective a pen recorder having a multicolor switching capability.

The pen recorder has a table 1 with a slot 1a in which there is disposed a feed roller 2 having a shaft 3 coupled to a stepping motor (not shown). The feed roller 2 is rotatable bidirectionally for reciprocally moving a recording sheet S in the directions of the arrow Y on the table 1. A carriage 4 is disposed over the table 1 and is movable along a guide shaft 5 and a pen changer shaft 6 extending parallel to the guide shaft 5. The carriage 4 can be moved reciprocally in the directions of the arrow X by being pulled by a wire (not shown) driven by a stepping motor (not shown). A support plate 7 is fixed to a lower end of the carriage 4, and a pen holder 8 is angularly movably mounted by a vertical shaft to an upper portion 4a of the carriage 4. Four pens P are held on the pen holder 8, the pens P extending perpendicularly to the table 1 and being movable toward and away from the table 1. The four pens P contain water-based or oil-based ink, and are differently colored in red, blue, black and green, for example. A return spring 9 is disposed around the distal end of each pen P for resiliently urging the pen P in a vertical direction to move the pen tip away from the table 1. The support plate 7 has a front edge portion divided into two pressers 7a each bent into a V shape for pressing the recording sheet S against the table 1 to facilitate the writing movement of the pens P thereon. A hammer 10 is disposed in confronting relation to the opposite end of one of the four pens P which is in the writing position O. The hammer 10 has a substantially central portion swingably supported by a pin 11 on an upper portion of the carriage 4. A hammer spring 12 is coiled around the pin 11 and has an arm engaging an upper surface of the hammer 10 for normally urging the hammer 10 in a direction to push the pen P. A drive lever 13 is disposed in confronting relation to a rear upper surface of the hammer 10, the drive lever 13 comprising a metal plate extending parallel to the guide shaft 5. The drive lever 13 has on opposite ends thereof bent members 13a angularly movably supported on the guide shaft 5. A drive pin 14 is fixed to an outer surface of one of the bent members 13a (which is illustrated in FIG. 1).

Figure 2:
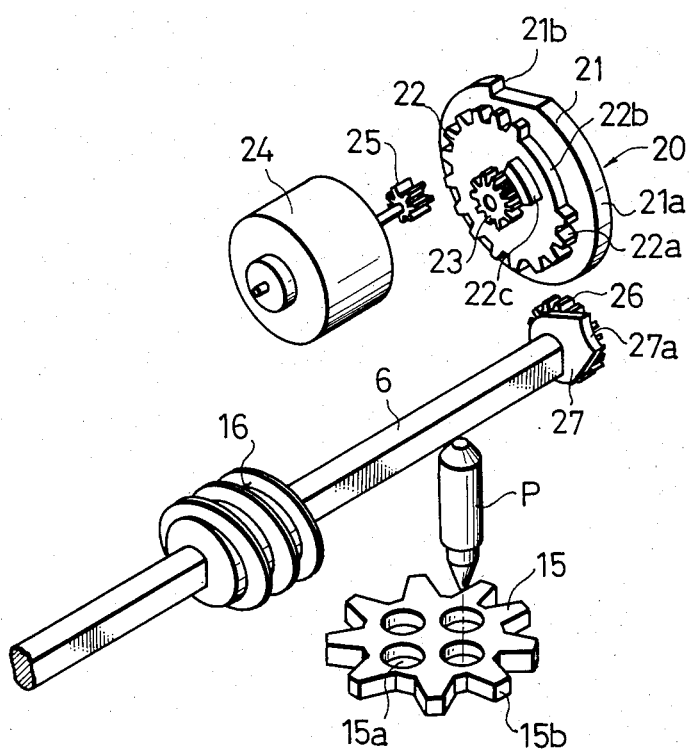
FIG. 2 is an exploded perspective view of a driving mechanism according to the present invention.

The guide shaft 5 is supported by opposite side plates (not illustrated) of the pen recorder. A pen retainer 15 is integrally disposed on a lower portion of the pen holder 8. As shown in FIG. 2, the pen retainer 15 has four holes 15a for guiding the tips of the four pens P, respectively, and has successive teeth 15b on its periphery (which are omitted from illustration in FIG. 1). The pen changer shaft 6 is of an elliptical cross section, with a worm gear 16 being fixed thereto and located within the carriage 4. The worm gear 16 is held in mesh with the teeth 15b on the pen retainer 15 at the lower end of the carriage 4. The pen changer shaft 6 is rotatably supported by the oppositing side plates of the pen recorder.

Figure 3:
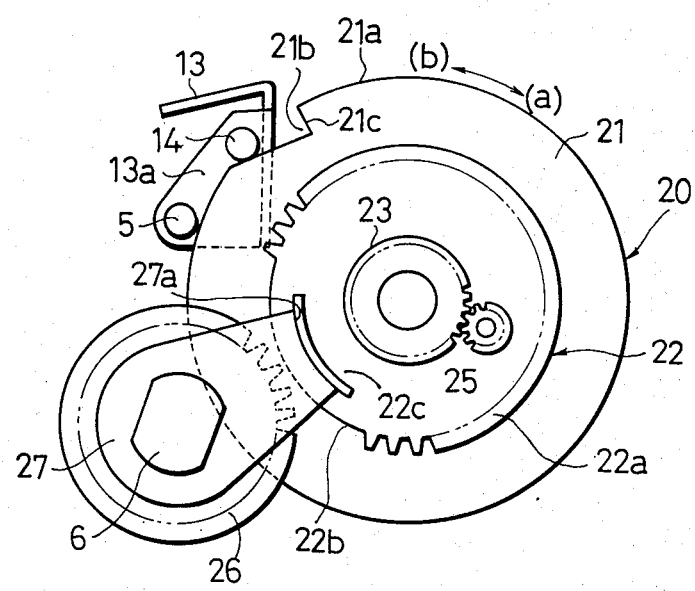
FIG. 3 is an enlarged side elevational view of the driving mechanism shown in FIG. 2.

A drive disc 20 is rotatably supported on one of the side plates of the pen recorder. As shown in FIGS. 2 and 3, the drive disc 20 has a cam 21, an intermittent gear 22, and a smaller-diameter gear 23 which are integral with the drive disc 20. A stepping motor 24 (FIG. 2) is positioned on one side of the drive disc 20 and has a rotatable shaft to which is fixed a pinion 25 held in mesh with the smaller-diameter gear 23. Thus, the drive disc 20 can be driven by the stepping motor 24.

Figure 4:
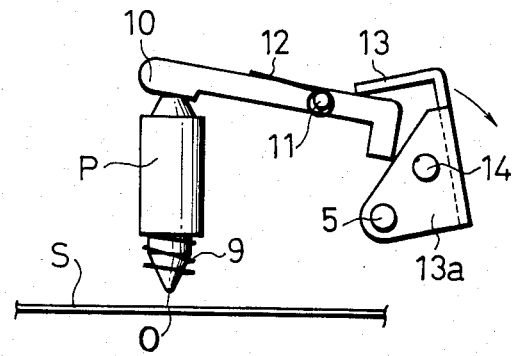
FIG. 4 is a side elevational view of a hammer driving mechanism.

The cam 21 serves to drive the hammer 10. The cam 21 has a peripheral disc surface 21a including a recess 21b. The drive pin 14 secured to the bent member 13a of the drive lever 13 is held against the peripheral disc surface 21a of the cam 21. As illustrated in FIG. 4, the hammer 10 is normally urged to turn counterclockwise under the force of the hammer spring 12. A front edge portion of the drive lever 13 is lifted by the rear end of the hammer 10, so that the drive lever 13 is turned clockwise about the guide shaft 5 until the drive pin 14 is pressed against the peripheral disc surface 21a. When the drive pin 14 reaches the recess 21b upon rotation of the cam 21, the drive pin 14 drops from the peripheral disc surface 21a into the recess 21b under the force of the hammer spring 12, whereupon the drive lever 13 is turned clockwise as shown in FIG. 4. Therefore, the hammer 10 is turned counterclockwise to cause its distal end to push the pen P toward the recording sheet S.

The intermittent gear 22 serves to turn the pen holder 8 for selecting one of the pens P. The intermittent gear 22 is composed of peripheral teeth 22a and a tooth-free recess 22b and has an integral arcuate projection 22c on an inner surface thereof. The pen changer shaft 6 has on an end thereof a gear 26 and a stopper cam 27 secured thereto, the stopper cam 27 having a recessed sliding surface 27a having substantially the same curvature as that of an outer peripheral surface of the projection 22c.

Operation of the pen recorder thus constructed is as follows:

The recording sheet S is supplied onto the table 1 and sandwiched between the feed roller 2 and a pinch roller (not shown) disposed thereabove.

During recording operation, the recording sheet S is reciprocally moved in the directions of the arrow Y by rotating the feed roller 2 bidirectionally with one of two stepping motors (not shown) and the carriage 4 is reciprocally moved in the directions of the arrow X with the other stepping motor by means of a wire. When the drive disc 20 is turned in the direction of the arrow (a) shown in FIG. 3 and the drive pin 14 rides on the peripheral disc surface 21a of the cam 21, the drive lever 13 is turned counterclockwise to depress the rear end of the hammer 10 and raise the distal end thereof. The pen P in the writing position O is then lifted by the force of the return spring 9 so that the tip of the pen P is moved upwardly off the recording sheet S. Conversely, when the drive disc 20 is rotated in the direction of the arrow (b) in FIG. 3 to have the drive pin 14 fall into the recess 21b, the drive lever 13 is turned clockwise in FIG. 4 to allow the hammer 10 to turn counterclockwise under the force of the hammer spring 12, thereby pushing the pen P in the writing position O with the distal end of the hammer 10 until the tip of the pen P is brought into abutment against the recording sheet S. With the pen tip held against the recording sheet, the movement of the recording sheet S in the directions of the arrow Y and the movement of the carriage 4 in the directions of the arrow X are controlled to draw desired characters, marks, graphic patterns, or the like on the recording sheet S.

More specifically, when the drive disc 20 is turned by the stepping motor 24 in the direction of the arrow (a) through a small angle, the pen P is lifted off the recording sheet S. Conversely, when the drive disc 20 is turned in the direction of the arrow (b) through a small angle, the pen P is pressed against the recording sheet S. The angle of reciprocal angular movement of the drive disc 20 during upward and downward driven movement of the pen P is small, and in such small angular movement, the sliding surface 27a of the stopper cam 27 is kept in sliding contact with the outer peripheral surface of the projection 22c, and the gear 26 remains confronting the tooth-free recess 22b in the intermittent gear 22. Therefore, the stopper cam 27 and the pen changer shaft 6 do not rotate, and the pen holder 8 does not rotate, thereby keeping the selected pen P located in the writing position O.

When the pen P in the writing position O is to be replaced with another one for changing the printing colors, the drive disc 20 is driven by the stepping motor 24 to make about one revolution in the direction of the arrow (a). During an initial stage of such revolution, the drive pin 14 rides from the recess 21b in the cam 21 onto the peripheral disc surface 21a to lift the pen P off the recording sheet S. Continued rotation of the drive disc 20 in the direction of the arrow (a) causes the projection 22b to disengage from the sliding surface 27a of the stopper cam 27 and also causes the teeth 22a of the intermittent gear 22 to mesh with the gear 26. Thus, the pen changer shaft 6 rotates with the gear 26. Power is now transmitted from the worm gear 16 fixed to the pen changer shaft 6 to the teeth 15b (FIG. 2) of the pen retainer 15 on the pen holder 8, which is then rotated. When the drive disc 20 makes about one revolution in the direction of the arrow (a) and the drive pin 14 has reached a position immediately preceding the recess 21b, the pen holder 8 is turned through about 90° to bring another color pen P into the writing position O. At this time, the gear 26 has moved out of mesh with the teeth 22a into confronting relation with the tooth-free recess 22b. Therefore, after the pens have been changed, the pen changer shaft is stopped again. For bringing the new pen P into abutment against the recording sheet S, the drive disc 20 is further turned in the direction of the arrow (a) to let the drive pin 14 drop into the recess 21b. The drive lever 13 is now turned to actuate the hammer 10 to press the pen P in the writing position O against the recording sheet S. By reciprocally turning the drive disc 20 through a small angle, the pen P is repeatedly moved into and out of abutting engagement with the recording sheet S.

Since the hammer 10 is driven and the pen holder 8 is turned by the stepping motor 24, it is necessary to set an initial position for the drive disc 20 when the power supply for the pen recorder is switched on. Such initial position setting is carried out as follows: The electric circuit including the stepping motor 24 is arranged such that when the power supply is turned on, the stepping motor 24 is started to drive the drive disc 20 to make at least one revolution in the direction of the arrow (b). The drive pin 14 will therefore abut against an edge 21c of the recess 21b, whereupon the initial position is established.

Although in the illustrated embodiment the cam 21 and the intermittent gear 22 are integral with each other, they may be separate and may operate in coaction through a gear.

The present invention has the following advantages:

(1) Since the hammer is driven and the pens are changed by the single motor, there is no need for two solenoids to be installed in the pen recorder, which is then simpler in construction and lighter in weight. The pen recorder of the invention consumes a smaller amount of electric power than does a pen recorder with two solenoids.

(2) The pen changeover and the hammer driving are performed by rotation of the single motor, and the sound produced by the pen changeover and the hammer driving is reduced, resulting in an increased quality of the pen recorder product.

Although a certain preferred embodiment has been shown and described, it should be understood that many changes and modifications may be made therein without departing from the scope of the appended claims.

What is claimed is:

1. A mechanism for driving a pen recorder, comprising:
    (a) a carriage movable with respect to a recording sheet;
    (b) a pen holder rotatably mounted on said carriage and carrying a plurality of pens, said pen holder having a writing position in which one of said pens at a time can be located, said pen holder including a rotatable pen selector mechanism;
    (c) a hammer swingably mounted on said carriage for pressing one of said pens in said writing position toward the recording sheet;
    (d) a motor;
    (e) a cam rotatable by said motor;
    (f) a lever for actuating said hammer, said lever having a portion held in sliding contact with said cam, so that said hammer can be driven by said cam;
    (g) an intermittent gear rotatable in unison with said cam; and
    (h) a driven gear held in mesh with said intermittent gear and having a shaft coupled with said rotatable pen selector mechanism.

2. A mechanism according to claim 1, wherein said portion of said lever comprises a drive pin, said cam having a peripheral surface including a recess, said drive pin being held in sliding contact with said peripheral surface.

3. A mechanism according to claim 1, wherein said intermittent gear has a tooth-free recess in a toothed peripheral surface thereof, said shaft of said driven gear supporting a worm gear, said rotatable pen selector mechanism including a pen retainer having holes for guiding said pens respectively therein and peripheral teeth held in mesh with said worm gear.

* * * * *